(12) United States Patent
Ramamoorthy et al.

(10) Patent No.: US 11,398,969 B2
(45) Date of Patent: Jul. 26, 2022

(54) NETWORK CONVERSATION TESTING OF FLOW LEVEL OPERATIONS

(71) Applicant: Cisco Technology, Inc., San Jose, CA (US)

(72) Inventors: Prapanch Ramamoorthy, Bangalore (IN); Bhavik Shah, Bangalore (IN); Rahul Nandan Koravankuzhi, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/749,007

(22) Filed: Jan. 22, 2020

(65) Prior Publication Data

US 2021/0226880 A1 Jul. 22, 2021

(51) Int. Cl.
| | | |
|---|---|---|
| *H04L 43/50* | (2022.01) | |
| *H04L 47/32* | (2022.01) | |
| *H04L 69/16* | (2022.01) | |
| *H04L 61/256* | (2022.01) | |

(52) U.S. Cl.
CPC ............ *H04L 43/50* (2013.01); *H04L 47/32* (2013.01); *H04L 61/256* (2013.01); *H04L 69/16* (2013.01)

(58) Field of Classification Search
CPC ....... H04L 43/50; H04L 47/32; H04L 61/256; H04L 69/16
See application file for complete search history.

(56) References Cited

U.S. PATENT DOCUMENTS

| | | | | |
|---|---|---|---|---|
| 5,721,728 | A | * | 2/1998 | Fowler ............... H04M 3/2254 370/410 |
| 6,651,099 | B1 | | 11/2003 | Dietz et al. |
| 7,418,492 | B1 | * | 8/2008 | Cohen .................... H04L 43/00 709/224 |
| 7,738,403 | B2 | | 6/2010 | Ottamalika et al. |
| 8,041,804 | B2 | | 10/2011 | Ottamalika et al. |
| 8,248,958 | B1 | * | 8/2012 | Tulasi .................... H04L 43/50 370/250 |
| 8,510,436 | B2 | | 8/2013 | Ottamalika et al. |
| 8,726,382 | B2 | | 5/2014 | Knapp et al. |
| 8,769,091 | B2 | | 7/2014 | White, Jr. et al. |

(Continued)

FOREIGN PATENT DOCUMENTS

| | | | |
|---|---|---|---|
| CN | 110365548 A | * 10/2019 | |
| WO | WO-03102804 A1 | * 12/2003 | ............... H04L 1/24 |

OTHER PUBLICATIONS

Townsley, Mark et al., "Debug Label And Related Techniques", IPCOM000249807D, Apr. 7, 2017, 5 pages.

*Primary Examiner* — James R Sheleheda
(74) *Attorney, Agent, or Firm* — Edell, Shapiro & Finnan, LLC (57) ABSTRACT

A test module tests the configuration of a network device. The test module obtains test parameters for a test process of the network device, and determines that the test parameters indicate a network conversation to test the network device. The network conversation includes a sequence of multiple messages. The test module also generates an initial message of the network conversation based on the test parameters, and provides the initial message to the network device. The test module further tracks processing results of the network device processing the initial message in the test process.

20 Claims, 5 Drawing Sheets

(56) References Cited

U.S. PATENT DOCUMENTS

| | | | |
|---|---|---|---|
| 9,071,542 B2 | 6/2015 | Jackowski et al. | |
| 9,130,826 B2 | 9/2015 | Nispel et al. | |
| 9,654,490 B2 * | 5/2017 | Kim | H04L 63/1433 |
| 9,910,766 B2 * | 3/2018 | Cecchetti | G06F 11/3664 |
| 2004/0001443 A1 * | 1/2004 | Soon | H04L 45/00 |
| | | | 370/244 |
| 2005/0007958 A1 * | 1/2005 | Auerbach | H04L 43/50 |
| | | | 370/241 |
| 2007/0171834 A1 * | 7/2007 | Sathyanarayana | H04L 43/50 |
| | | | 370/241 |
| 2009/0003221 A1 * | 1/2009 | Burns | H04L 12/2856 |
| | | | 370/241 |
| 2010/0220628 A1 * | 9/2010 | Zhu | H04L 65/103 |
| | | | 370/252 |
| 2012/0327796 A1 * | 12/2012 | Ozaki | H04W 24/06 |
| | | | 370/252 |
| 2013/0019314 A1 * | 1/2013 | Ji | H04L 63/168 |
| | | | 726/25 |
| 2013/0283262 A1 | 10/2013 | Rehtijarvi | |
| 2013/0340083 A1 * | 12/2013 | Petrica | G06F 11/263 |
| | | | 726/25 |
| 2017/0214703 A1 * | 7/2017 | Tekchandani | H04L 63/02 |
| 2018/0083859 A1 * | 3/2018 | Barnum | H04L 69/24 |
| 2018/0234309 A1 * | 8/2018 | Li | H04L 43/50 |
| 2018/0278548 A1 | 9/2018 | Pignataro et al. | |
| 2018/0359273 A1 * | 12/2018 | Woolley | H04L 12/413 |
| 2019/0280914 A1 * | 9/2019 | Menon | H04L 47/36 |
| 2019/0289481 A1 * | 9/2019 | Qvarfordt | H04B 7/0626 |

* cited by examiner

NETWORK CONVERSATION TESTING OF FLOW LEVEL OPERATIONS

TECHNICAL FIELD

The present disclosure relates to testing network processing in network devices.

BACKGROUND

Security in network solutions is moving from traditional stateful firewall solutions, which includes access rules based on Internet Protocol (IP) addresses and Transport Control Protocol (TCP)/User Datagram Protocol (UDP) ports, to threat centric solutions, which apply policies based on the context of what user is accessing which data, how the user is accessing the data, from where the user is accessing the data, and similar context features. For instance, a threat centric security solution may be based on user identities, Universal Resource Locators (URLs) and associated categories, malware downloads, and Intrusion Protection System (IPS) signatures.

Some threat centric solution rely on metadata gathered during the life of the data flow, and apply policies based on features of more than a single packet in the data flow. For instance, detecting an application or micro-application may require tens of packets of a network connection to detect the type of application. Additionally, some malware signatures depend on the availability of more than a single packet in the data flow before detecting whether the accessed data is malware.

Knowing how to configure policies, understanding the impact of their policies, and troubleshooting problems with the configured policies presents challenges to network and security operators. The operators require knowledge of the order of operations, as well as require additional information, such as sniffer traces, systems events, and logs. For threat centric solutions, the operators require matching metadata fields against various configured features. The complexity increases as the number of rules and available features increase over time.

DESCRIPTION OF EXAMPLE EMBODIMENTS

Overview

A computer implemented method is provided to enable a test module to test the configuration of a network device. The method includes obtaining test parameters for a test process of the network device, and determining that the test parameters indicate a network conversation to test the network device. The network conversation includes a plurality of messages. The method also includes generating an initial message of the network conversation based on the test parameters, and providing the initial message to the network device. The method further includes tracking processing results of the network device processing the initial message in the test process.

Another aspect of the techniques presented herein includes providing a plurality of messages according to a conversation template. The plurality of messages in the conversation template may be predefined to test one or more commonly used functions of typical network devices. Alternatively, the conversation template may be defined by an end user, such as a network administrator, to test a function of the network device that may be more applicable to a particular network implementation than to a typical network implementation.

EXAMPLE EMBODIMENTS

Presented herein is a system for probing networking configuration/security policies of a network device based on predefined application/network connection templates that may be customized by users with values specific to their environment. Additionally, the conversation for probing the network device may be partially dynamic. The original ingress interface (e.g., IP address, etc.) is input by a user, and the configured policies and rules under test determine any subsequent interface involved in the conversation, as well as any address/port translation. Further, users may define customized applications to define application conversations that may be applicable to specific users or user groups.

Single packet replay systems enable firewall appliances to be tested against simple threat models, but do not permit more sophisticated testing mechanisms that consider threats that may require multiple packets to identify. The techniques presented herein provides the ability to dynamically build conversations based on user inputs for a predefined set of applications. In contrast to statically mapping the direction of the conversation with the network interface, the techniques presented herein only involve user input of the first packet to the network interface. Thereafter, the system dynamically generates the second and subsequent packets, including the reverse direction of the conversation, as well as any changes to the IP addressing and ports due to, for example, Network Address Translation (NAT)/Port Address Translation (PAT).

Typical packet generators may appear to support generic custom streams based on user input. However, they typically run actual clients and servers in order to send the traffic through a device under test. The techniques presented herein provide for a solution local to the device under test, without additional clients/servers on the network. There are no external dependencies needed for the techniques presented herein, which may be completely implemented on the device under test.

The techniques presented herein focus on the ability to simulate an entire network conversation through a network device (e.g., a Next Generation Firewall) that makes determinations based on network conversations rather than individual packets that make up the conversation. A user may identify input parameters, such as the input interface, protocol, source IP address, source port, destination IP address, destination port, user identity of the source/destination, and/or any Layer 7 parameters (e.g., Uniform Resource Locator (URL), application, micro-application, etc.). In one example, the user may specify a custom network configuration based on a packet capture file.

If the user's input includes only Layer 3 and/or Layer 4 parameters, the system only injects a single packet, and displays the results like a typical packet tracer. When the user specifies additional parameters, e.g., user identity, Layer 7 parameters, then the system generates a custom network conversation to inject into the network device under test.

Figure 1:
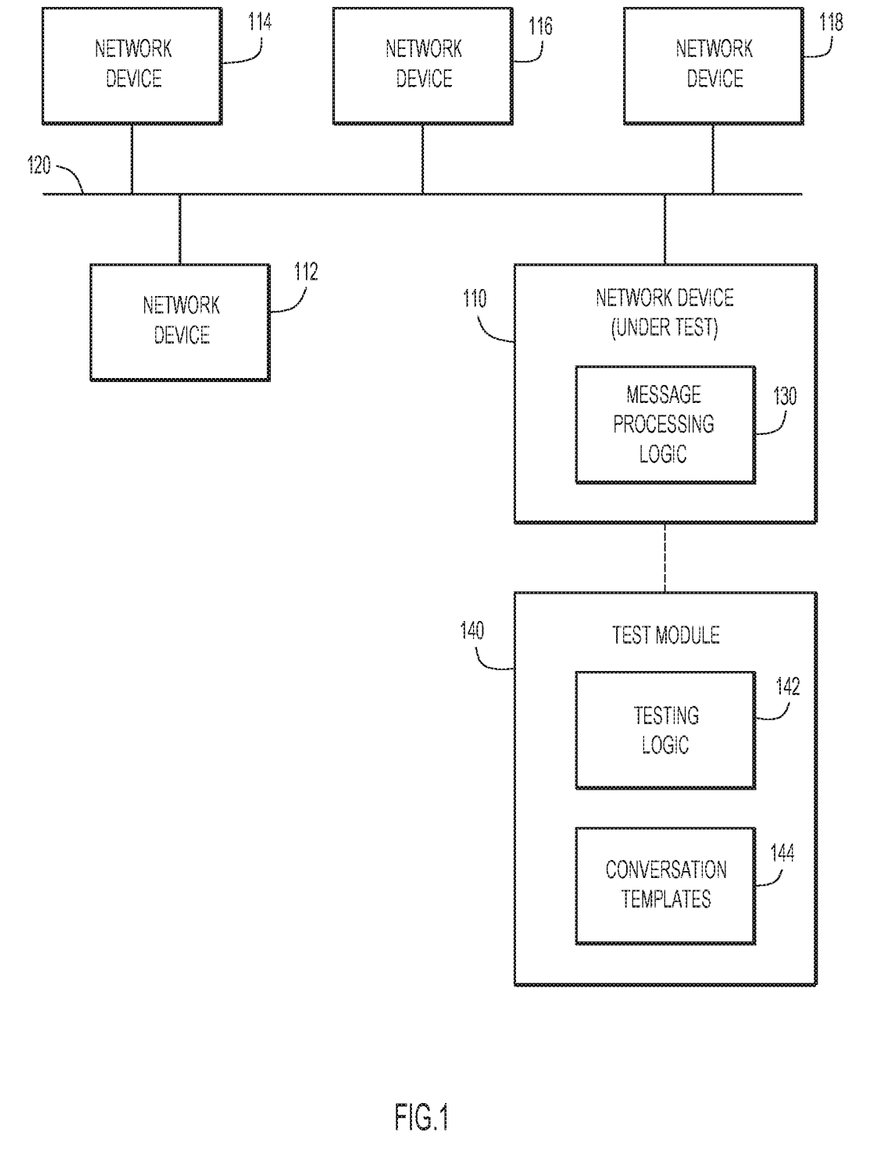
FIG. 1 is a simplified block diagram of a network system of network devices to be tested according to an example embodiment.

Referring now to FIG. 1, a network system comprising network devices 110, 112, 114, 116, and 118 communicatively coupled through network 120 is shown. The network device 110 includes message processing logic 130 to process messages (e.g., packets, frames, etc.) that are received by (or sent to) the network device 110. The network devices 112, 114, 116, and 118 may also include message processing logic similar to the message processing logic 130 on network device 110. As shown in FIG. 1, the network device 110 is the network device under test by a test module 140. The test module 140 includes testing logic 142 configured to operate a test process on the network device under test (e.g., network device 110). The test module also includes conversation templates 144 that associate a sequence of messages with predefined input parameters (e.g., Layer 7 parameters).

In one example, the network device 110 may be a router, a switch, a firewall, a NAT/PAT device, or any other type of physical or virtual computing device configured to handle network traffic. The test module 140 may be implemented in an on-device utility that allows users (e.g., network administrators) to build and trace conversations without the need for additional devices to be connected, or actual network traffic to be sent. The application of the test utility may include security posture validation, policy validation, proof of concept/value testing, and/or Quality Assurance automation.

Figure 2:
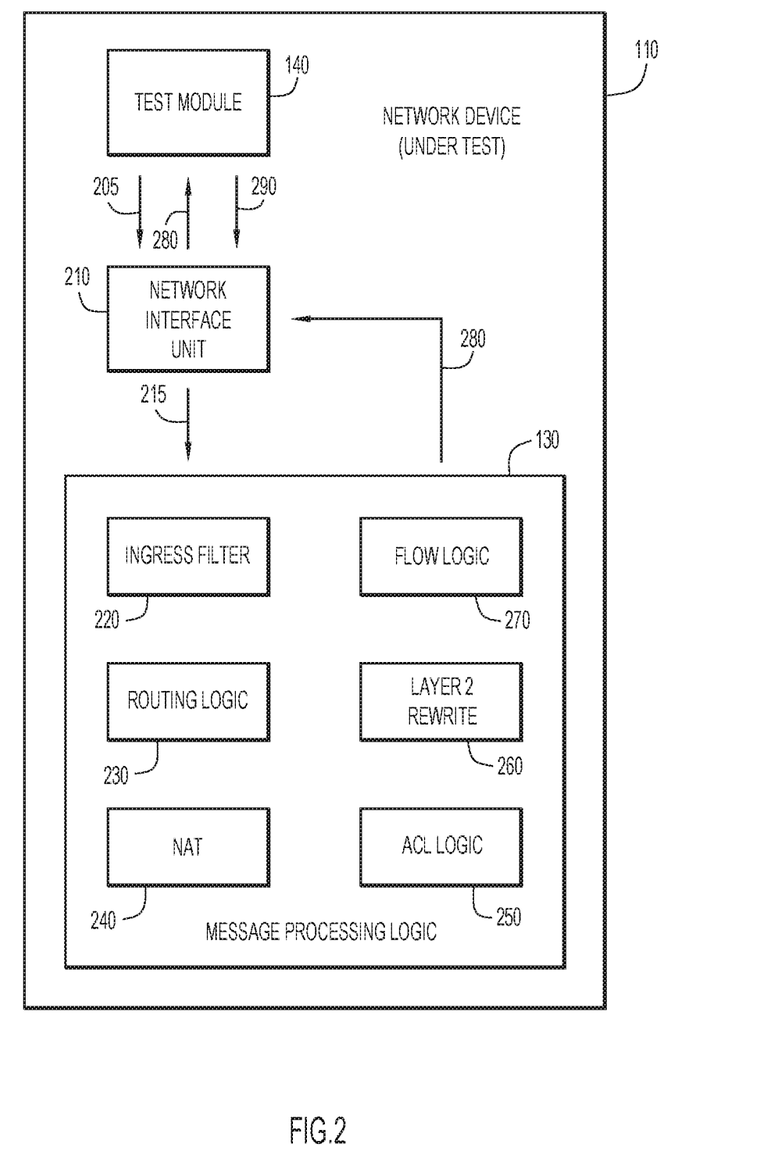
FIG. 2 is a simplified block diagram of the network device under test, according to an example embodiment.

Referring now to FIG. 2, a simplified block diagram illustrates an example flow of the test module 140 performing a test process on the network device 110. The test module 140 prepares an initial message 205 from the test parameters of the test process. The test parameters may be set by a user (e.g., network administrator) to test various functions and configuration settings of the network device 110. Additionally, the initial message 205 may be tagged as a test message (e.g., via a predefined bit in a message header) to signal that the network device 110 is to track any processing of the message 215, as well as to prevent the message 215 from being forwarded to a different network device. The test module provides the initial message 205 to a network interface unit 210 in the network device 110, which passes the message 215 to the message processing logic 130.

In the example shown in FIG. 2, the message processing logic 130 includes an ingress filter 220, routing logic 230, NAT logic 240, Access Control List (ACL) logic 250, Layer 2 rewrite logic 260, and flow logic 270. The ingress filter 220 is configured to compare the parameters of the message 215 to various filters, which may cause the message processing logic 130 to allow or deny the message 215. The routing logic 230 determines which network interface the message 215 will be routed through when transmitted from the network device 110. The NAT logic 240 may be configured to translate a network address associated with the message 215. The ACL logic 250 may be configured to compare parameters of the message 215 to one or more predefined access control policies. The Layer 2 rewrite logic 260 may be configured to rewrite the frame of the message 215 to send the message 215 to the appropriate next hop. The flow logic 270 may be configured to associate the message 215 with a flow of message, which may be identified with a particular flow identifier. The logic modules in message processing logic 130 shown in FIG. 2 are enumerated as specific examples of message processing logic, and should not be construed as limiting the scope of the message processing logic 130. In general, the message processing logic 130 may include one or more logic modules that may have the capability to match patterns in the messages/conversation and/or take action on the messages (e.g., allow, drop, consume, punt, modify, etc.).

Once the message processing logic 130 completes any processing of the message 215, the message processing logic 130 returns a processed message 280 to the network interface, which detects that message 280 is a test message and provides the message 280 to the test module 140. The test module 140 may generate the next message 290 in the network conversation based on the parameters in the processed message 280.

In one specific example, an organization may define rules for handling network traffic according to the policies listed in Table 1. While the rules and policies in this example are specific to security/firewall deployments, any type of network device may benefit from the techniques described herein. For instance, rather than the Intrusion Prevention System (IPS) and malware policy described in Table 1, the test module may be configured to test Quality of Service (QoS) policy or general network routing policy.

TABLE 1

Example Security Policies

| Rule | Protocol | Source address | Dest. address | App. | URL | IPS Policy | Malware Policy | Action |
|---|---|---|---|---|---|---|---|---|
| 1 | Any | 10.1.1.100/32 | Any | FTP | Any | No | No | Allow |
| 2 | Any | 10.1.1.0/24 | Any | Any | www.abc.com | No | No | Deny |
| 3 | Any | Any | Any | Any | Any | Yes | Yes | Allow |

In a first example, a user initiates a test process/conversation with the following parameters:

Ingress interface: inside
Network Protocol: TCP
Source address: 10.1.1.100
Source Port: 12345
Destination Address: 192.168.10.100
Application Protocol: HTTP
HTTP URL: www.abc.com
HTTP method: GET Since the user has specified parameters that are not merely Layer 3 and Layer 4 parameters, the test module 140 builds a network conversation based on the specified application protocol (i.e., HTTP). The network conversation will include the following packets, in the specified order: TCP SYN (with the specified parameters), TCP SYN-ACK in the reverse direction, TCP ACK with the specified parameters, HTTP GET request as specified, HTTP response, TCP/FIN/ACK with the specified parameters, TCP FIN/ACK in the reverse direction.

Based on this template of an HTTP conversation, the test module 140 injects the first packet (e.g., message 215) as a TCP SYN packet marked with a custom flag to indicate that the first packet is an injected packet that the network device 110 is to track at various stages of packet processing. The stages may include, but is not limited to, input filters (e.g., ingress filter 220), routing (e.g., routing logic 230), NAT logic 240, Deep Packet Inspection (DPI), encryption/decryption, access control policy (e.g., ACL logic 250), and/or Layer 2 rewrite logic 260. The result of each stage is captured and stored in memory to be displayed to the user. If the first packet is allowed, the system injects the next packet (e.g., message 290) as a TCP SYN-ACK packet in the reverse direction based on the output interface determined by processing the first packet.

In particular, since the second packet in this example is in the reverse direction, the interface to which the second packet is injected is determined based on the outgoing interface of the first packet. Since this is dynamic in nature (e.g., due to policy-based routing, dynamic routing, etc.), the second interface can only be determined after the first packet in the forward direction is processed. Additionally, the IP addresses and ports of the packets in the reverse direction of the conversation are modified as appropriate, e.g., if the packets in the forward direction are subject to NAT/PAT before being transmitted. Again, these addresses/ports are dynamic in nature, and may not be decided until the first packet of the forward direction has been injected and processed.

After dynamically generating the second packet, as described above, the second packet is injected to the network device 110 under test, and will be processed in a similar fashion to the first packet. The same processing and tracking process will be followed for the second and subsequent packets. If at any point, a packet is dropped (e.g., due to a security or routing policy), the injection process stops, and the test module 140 may display results to the user.

Returning to the specific example, the output of the test module 140 on the network device 110, which is configured with the policies described in Table 1 may be:

Packet 1: Interface inside 10.1.1.100:12345→192/168.10.100:80 TCP SYN
Ingress filter: Allow—no filter matched
Routing: Allow—Static route to "outside" interface
NAT: Allow—Translate the source address to outside interface address: 172.16.1.200
Access Control policy: Pending—Rule #1 needs more data to match application "FTP"
Layer 2 rewrite: Packet sent to next hop 172.16.1.100, interface "outside"
Created flow with ID 100
Packet 2: Interface "outside" 192.168.10.100:80→172.16.1.200:12345 TCP SYN-ACK
Ingress filter: Allow—no filter matched
Existing flow lookup: Found flow with ID '100'
Access control policy: Pending—Rule #1 needs more data to match application "FTP"
Layer 2 rewrite: Packet sent to next hop 10.1.1.100, interface "inside"
Packet 3: Interface inside 10.1.1.100: 12345→192.168.10.100:80 TCP ACK
Ingress filter: Allow—no filter matched
Existing flow lookup: Found flow with ID '100'
Access control policy: Pending—Rule #1 needs more data to match application "FTP"
Layer 2 rewrite: Packet sent to next hop 172.16.1.100, interface "outside"
Packet 4: Interface inside 10.1.1.100: 12345→192.168.10.100:80 HTTP GET http://www.cisco.com
Ingress filter: Allow—no filter matched
Existing flow lookup: Found flow with ID '100'
Access control policy: Deny—Rule #1 no match as application is HTTP. Matched Rule #2.

Once the fourth packet is denied, the test process ends. The remaining three packets of the planned network conversation are not injected, and there are no processing results of the non-injected packets to display. The processing results shown in this specific embodiment are examples of some of the packet processing that the network device may perform. Other processing steps may be included in the processing results, including down to hardware level processing stages (e.g., which processor of the network device performed which operations in the processing of each packet).

In a second specific example, a user may initiate the test process with the following parameters:
Ingress interface: inside
Network Protocol: UDP
Source address: 10.1.1.100
Source port: 5060
Destination address: 192.168.10.100
Destination port: 5060

Since only Layer 3 and Layer 4 parameters are specified for the initial packet, the test module 140 runs as a typical packet tracer utility and displays the results for the single packet.

In a third specific example, a user may initiate a test of the network device 110 configured with the policies specified in Table 1, by using the following parameters:
Ingress interface: inside
Network Protocol: UDP
Source address: 10.1.1.100
Source port: 12345
Destination address: 192.168.10.100
Destination port: 53
Application protocol: DNS Since non-Layer ¾ parameters are specified (i.e., the application protocol for Domain Name System (DNS)), the test module 140 generates a network conversation based on a template for the specified application protocol. In this example, the conversation includes a first UDP-based DNS packet to request a domain resolution for any domain (e.g., www.abc.com) using the source/destination address/port as specified. Similar to the first specific example, the test module 140 generates and injects the first packet of the network conversation to track and record each stage of processing the packet. The conversation continues to the next packet only if the previous packet has been transmitted. In this example, the output will be:
Packet 1: Interface inside 10.1.1.100: 12345→192.168.1.100:80 UDP DNS A query www.abc.com
Ingress filter: Allow—no filter matched
Routing: Allow—Static route to "outside" interface
NAT: Allow—Translate the source address to "outside" interface address, 172.16.1.200
Access control policy: Allow—Rule #3. IPS and Malware inspection applied Layer 2 rewrite: Packet sent to next hop 172.16.1.100, interface "outside"
Created flow with ID 100
Packet 2: Interface outside 192.168.1.100:80→172.16.1.200:12345 UDP DNS A response abc.com:
Ingress filter: Allow—no filter matched
Existing flow lookup: Found flow with ID '100'
Access control policy: Drop—Previously matched rule #3. Drop due to IPS policy signature ID 1:41788.

The output display in the third specific example includes metadata on the reason why Packet 2 was dropped (i.e., due to IPS policy associated with a specified signature ID), which enables the user to better troubleshoot potential issues with the configuration of the network device.

The test module 140 may not include every permutation and combination of possible fields in a packet and the number of varied applications. To conserve resources, the test module 140 may be configured to natively support more common application level protocols (e.g., HTTP, ICMP, DNS, FTP, etc.) with some level of application specific fields. For instance, the template for HTTP conversations may natively support specifying the HTTP URL and method. In another instance, an Internet Control Message Protocol (ICMP) test conversation may natively support the ICMP request type/code and response type/code.

Though the test module 140 may not natively cover an exhaustive list of fields and application protocols, the test module 140 may allow a user to specify custom applications that test users can configure. In one example, the test module 140 allows users to upload a custom packet capture to define the custom application. The custom application supports the user modifying certain common fields in the packet header like the source and destination addresses, ports, and some of the protocol level fields, while retaining the rest of the parameters of packet as it was captured.

The net result and benefit of the ability to inject predefined, customizable network conversations, as described herein, is that the amount of time taken to gain visibility into the operations of a network device is reduced. Additionally, the time to troubleshoot issues with the network devices is drastically reduced.

Figure 3:
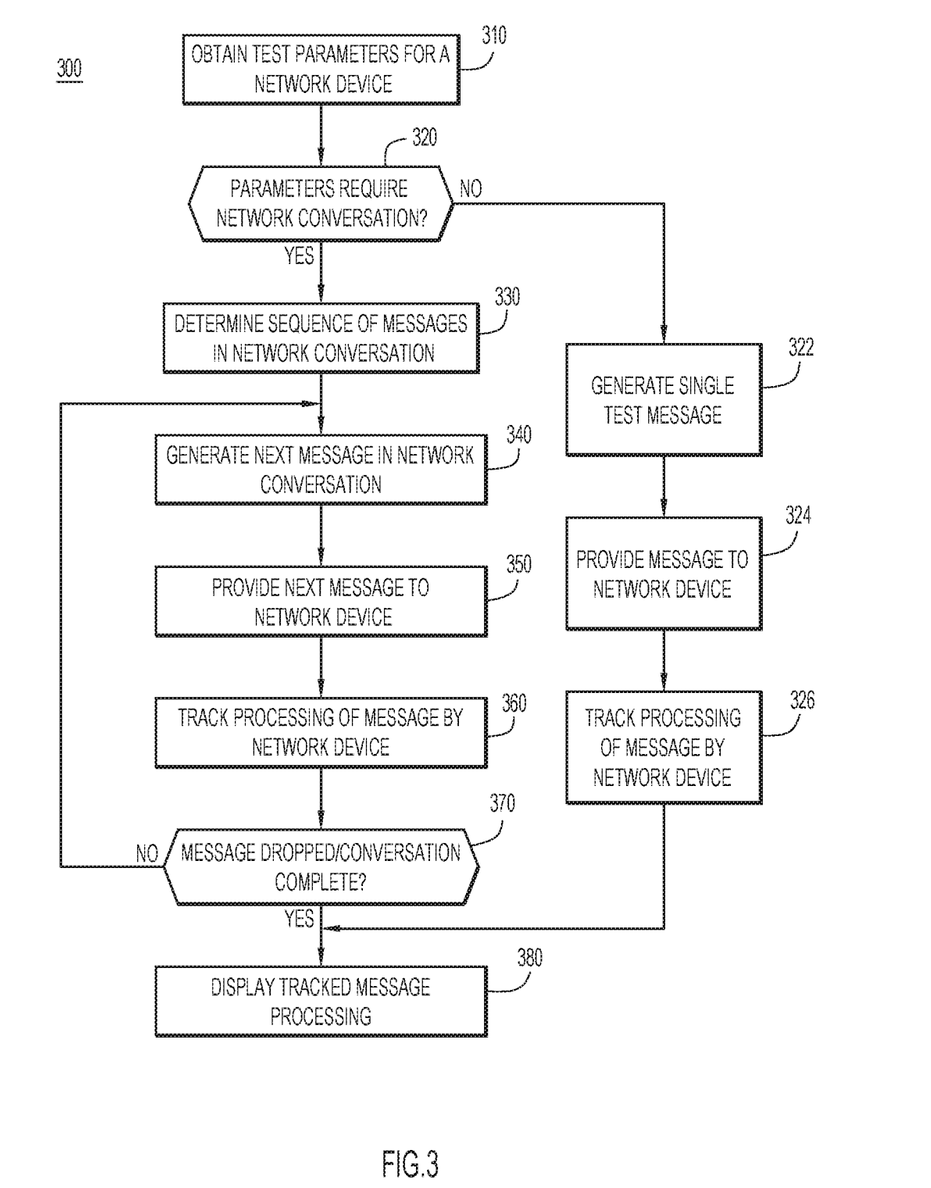
FIG. 3 is a flowchart illustrating operations of a test module for testing a network device according to an example embodiment.

Referring now to FIG. 3, a flowchart illustrates operations performed at a test module (e.g., test module 140) in a process 300 for testing the configuration of a network device (e.g., network device 110). At 310, the test module obtains test parameters for the test process of the network device. In one example, the test parameters may be obtained from a user directly inputting the test parameters appropriate for the test process. Alternatively, at least some of the test parameters may be obtained from one or more previously captured packets. The test module determines whether the test parameters require a network conversation to complete the test process at 320.

If the test parameters do not indicate that a multi-message network conversation is required, then the test module generates a single test message at 322 based on the test parameters. At 324 the test module provides the single test message to the network device and tracks the processing of the single test message by the network device at 326. If the test parameters do indicate that a network conversation is required, then the test module determines the appropriate sequence of messages in a network conversation at 330. In one example, the test parameters may indicate that a network conversation is required by including application layer protocols (e.g., File Transfer Protocol (FTP), Telnet, Simple Mail Transfer Protocol (SMTP), Domain Name System (DNS), Simple Network Management Protocol (SNMP), Real-time Transport Protocol (RTP), Hypertext Transfer Protocol (HTTP), etc.). The test module may associate a template of a sequence of messages (i.e., network conversation) with each application layer protocol, and may further associate another network conversation template with specific commands defined within an application layer protocol (e.g., HTTP GET). The network conversation templates may include a sequence of messages with default parameters that may be overridden by the input test parameters.

Once the test module has determined the sequence of messages planned for the network conversation in the test process, the test module generates the next message in the network conversation at 340. The initial message will be generated based on the test parameters obtained at 310, but subsequent messages in the network conversation may include parameters that were generated by the network device processing the previous messages in the network conversation. The test module provides the test message to the network device at 350 and tracks the processing of the message by the network device at 360.

At 370, the test module determines whether the processing of the message included dropping the packet for any reason (e.g., security policy, network policy, network configuration, etc.) or whether the network conversation is complete (i.e., the final message in the network conversation has been processed). In other words, the test module determines whether any additional messages are required to be generated and processed by the network device to complete the test process. If the test message that was processed by the network device was not dropped and is not the final message of the network conversation, then the test process returns to 340 and generates the next message in the network conversation.

The test process concludes after no more test messages are required (e.g., after a test message was dropped, after the final message of the network conversation has been processed, or there is only a single test message involved), then the test module displays the tracked processing results from the processing of the test message(s) at 380. In one example, the tracked processing results may be communicated to an endpoint that is connected to the network device and/or the test module. Additionally, the tracked processing results may be stored for later display and/or analysis.

Figure 4:
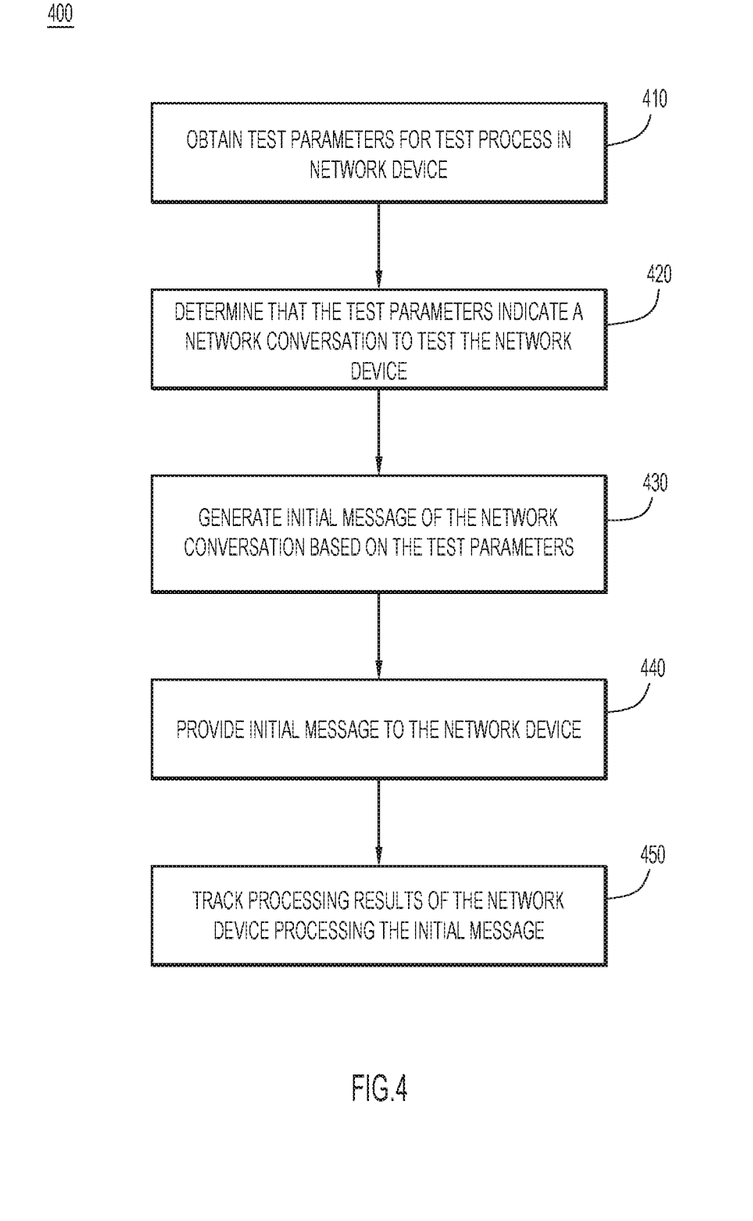
FIG. 4 is a flowchart illustrating operations of a test module for testing a network device according to another example embodiment.

Referring now to FIG. 4, a flowchart illustrates operations performed at a test module (e.g., test module 140) in a process 400 for testing the configuration of a network device (e.g., network device 110). At 410, the test module obtains test parameters for a test process in a network device. In one example, the test parameters may include a source network address/port, a destination network address/port, a network protocol, and an application protocol. At 420, the test module determines that the test parameters indicate a network conversation to test the network device. In one example, the test module may determine that the test parameters indicate a network conversation for the test process because the test parameters include an application layer parameter or other parameter that involves multiple messages to test how the network device handles processing the messages. In another example, the test parameters that indicate a network conversation may be associated with a predefined template of the network conversation.

At 430, the test module generates an initial message of the network conversation based on the test parameters. In one example, the test parameters provide the source network address/port and the destination network address/port for the initial message. In another example, the initial message includes an indication that the initial message is a test message. The indication that the initial message is a test message may be a predefined bit in a header of the initial message. At 440, the test module provides the initial message to the network device. In one example, the test module provides the initial message to the network device by injecting the initial message into the network interface unit of the network device.

At 450, the test module tracks any processing results of the network device processing the initial message in the test process. In one example, the test module may store and/or display the processing results to a user for further analysis. In another example, tracking the processing results may include determining that the initial message was dropped by the network device, causing the test module to end the test process. Alternatively, tracking the processing results may include obtaining further parameters that may be included in subsequent messages of the network conversation.

Figure 5:
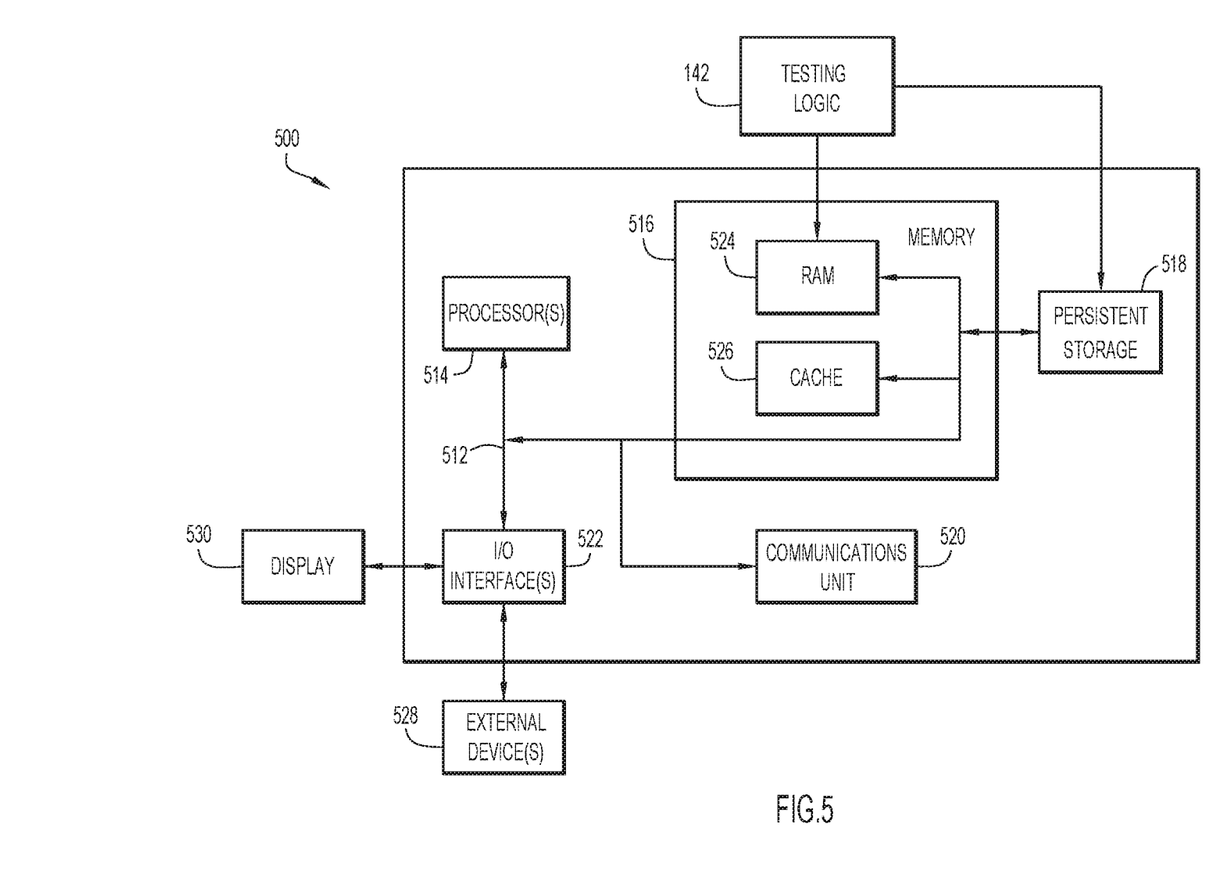
FIG. 5 illustrates a simplified block diagram of a device that may be configured to perform methods presented herein, according to an example embodiment.

Referring now to FIG. 5, a hardware block diagram illustrates a computing device 500 that may perform the functions of any of the servers or computing or control entities (e.g., test module 140) referred to herein in connection with the network device testing system described herein. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the testing logic 142 may be stored in memory 516 or persistent storage 518 for execution by processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface units, such as network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein provide for a test system that builds custom network conversations based on predefined application templates or user defined applications, while customizing certain parameters of the conversation based on user defined inputs. The test system begins by replaying each individual packet of the conversation and recording the result of all actions taken on every packet by the network device. Once the entire conversation is replayed or a packet of the conversation is dropped, the test system presents the results to the test user, giving a comprehensive view of the holistic conversation and the actions performed in it. The benefit is to ease the process of validating the configuration of network devices, and to aid in troubleshooting of network systems. In particular, the techniques presented herein enable policies that analyze multiple packets in a network flow to be tested and analyzed.

In one form, a method is provided to enable a test module to test the configuration of a network device. The method includes obtaining test parameters for a test process of the network device, and determining that the test parameters indicate a network conversation to test the network device. The network conversation includes a plurality of messages. The method also includes generating an initial message of the network conversation based on the test parameters, and providing the initial message to the network device. The method further includes tracking processing results of the network device processing the initial message in the test process.

In another form, an apparatus comprising a network interface, a processor, and a test module is provided. The network interface is configured to communicate with a plurality of computing devices across one or more computer networks. The processor is configured to process packets. The test module is configured to obtain test parameters for a test process of the apparatus, and determine that the test parameters indicate a network conversation to test the apparatus. The network conversation includes a plurality of messages. The test module is also configured to generate an initial message of the network conversation based on the test parameters, and provide the initial message to the processor via the network interface. The test module is further configured to track processing results of the processor processing the initial message in the test process.

In still another form, a system comprising a network device and a test module is provided. The network device is configured to process message between computing devices on one or more computer networks. The test module is configured to obtain test parameters for a test process of the network device, and determine that the test parameters indicate a network conversation to test the network device. The network conversation includes a plurality of messages. The test module is also configured to generate an initial message of the network conversation based on the test parameters, and provide the initial message to the network device. The test module is further configured to track processing results of the network device processing the initial message in the test process.

In yet another form, a non-transitory computer readable storage media is provided that is encoded with instructions that, when executed by a processor of a test module, cause the processor to obtain test parameters for a test process of a network device, and determine that the test parameters indicate a network conversation to test the network device. The network conversation includes a plurality of messages. The instructions also cause the processor to generate an initial message of the network conversation based on the test parameters, and provide the initial message to the network device. The instructions further cause the processor to track processing results of the network device processing the initial message in the test process.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining test parameters for a test process of a network device;
    determining that the test parameters indicate a network conversation to test the network device, the network conversation including a plurality of messages;
    generating an initial message of the network conversation based on the test parameters, the initial message including a predefined bit that signals the network device to track a plurality of stages for processing the plurality of messages by the network device and to prevent the network device from forwarding of the plurality of messages to another device;
    providing the initial message to the network device;
    tracking the plurality of stages for processing the initial message of the network conversation by the network device in the test process;
    modifying a subsequent message of the plurality of messages in the network conversation based on parameters generated in processing the initial message in the test process; and
    providing the subsequent message to the network device.

2. The method of claim 1, further comprising:
    tracking the plurality of stages for processing the subsequent message of the network conversation by the network device in the test process.

3. The method of claim 1, further comprising:
    responsive to a determination that the network device drops one of the messages in the network conversation, ending the test process without generating further messages in the network conversation.

4. The method of claim 1, further comprising displaying processing results of the network device processing the plurality of messages in the network conversation with the plurality of stages.

5. The method of claim 1, wherein the test parameters indicate the network conversation by including a Layer 7 parameter associated with the network conversation based on a predefined template of the plurality of messages.

6. The method of claim 1, further comprising providing an interface to define a predefined template for the network conversation associated with the test parameters.

7. The method of claim 1, wherein the plurality of stages for processing the plurality of messages of the network conversation by the network device includes one or more of ingress filter results, routing results, Network Address Translation (NAT) results, Deep Packet Inspection (DPI) results, user identity policy results, encryption/decryption results, access control policy results, or Layer 2 rewrite results.

8. An apparatus comprising:
    a network interface configured to communicate with a plurality of computing devices across one or more computer networks;
    a processor coupled to the network interface, the processor configured to process messages; and
    a test module configured to cause the processor to:
        obtain test parameters for a test process of the apparatus;
        determine that the test parameters indicate a network conversation to test the apparatus, the network conversation including a plurality of messages;
        generate an initial message of the network conversation based on the test parameters, the initial message including a predefined bit that signals the apparatus to track a plurality of stages for processing the plurality of messages by the processor and to prevent the plurality of messages from being forwarded to another device;
        provide the initial message to the processor;
        track the plurality of stages for processing the initial message of the network conversation by the processor in the test process;
        modify a subsequent message of the plurality of messages in the network conversation based on parameters generated in processing the initial message in the test process; and
        provide the subsequent message to the processor.

9. The apparatus of claim 8, wherein the test module is further configured to cause the processor to:
    track the plurality of stages for processing the subsequent message of the network conversation by the processor in the test process.

10. The apparatus of claim 8, wherein the test module is further configured to cause the processor to:
    responsive to a determination that the processor drops one of the messages in the network conversation, end the test process without generating further messages in the network conversation.

11. The apparatus of claim 8, wherein the test module is further configured to cause the processor to display processing results of the processor processing the plurality of messages in the network conversation with the plurality of stages.

12. The apparatus of claim 8, wherein the test parameters indicate the network conversation by including a Layer 7 parameter.

13. The apparatus of claim 12, wherein the plurality of stages for processing the plurality of messages of the network conversation by the processor includes one or more of ingress filter results, routing results, Network Address Translation (NAT) results, Deep Packet Inspection (DPI) results, user identity policy results, encryption/decryption results, access control policy results, or Layer 2 rewrite results.

14. A system comprising:
    a network device configured to process messages between computing devices on one or more computer networks; and
    a test module configured to:
        obtain test parameters for a test process of the network device;
        determine that the test parameters indicate a network conversation to test the network device, the network conversation including a plurality of messages;
        generate an initial message of the network conversation based on the test parameters, the initial message including a predefined bit that signals the network device to track a plurality of stages for processing the plurality of messages by the network device and to prevent the network device from forwarding of the plurality of messages to another device;
        provide the initial message to the network device;
        track the plurality of stages for processing the initial message of the network conversation by the network device in the test process;
        modify a subsequent message of the plurality of messages in the network conversation based on parameters generated in processing the initial message in the test process; and
        provide the subsequent message to the network device.

15. The system of claim 14, wherein the test module is further configured to:
   track the plurality of stages for processing the subsequent message of the network conversation by the network device in the test process.

16. The system of claim 14, wherein the test module is further configured to:
   responsive to a determination that the network device drops one of the messages in the network conversation, end the test process without generating further messages in the network conversation.

17. The system of claim 14, wherein the test module is further configured to display processing results of the network device processing the plurality of messages in the network conversation with the plurality of stages.

18. The system of claim 14, wherein the test parameters indicate the network conversation by including a Layer 7 parameter.

19. The system of claim 18, wherein the Layer 7 parameter is associated with the network conversation based on a predefined template of the plurality of messages.

20. The system of claim 14, wherein the plurality of stages for processing the plurality of messages of the network conversation by the network device includes one or more of ingress filter results, routing results, Network Address Translation (NAT) results, Deep Packet Inspection (DPI) results, user identity policy results, encryption/decryption results, access control policy results, or Layer 2 rewrite results.

* * * * *